(12) United States Patent
Kasahara et al.

(10) Patent No.: US 7,440,237 B2
(45) Date of Patent: Oct. 21, 2008

(54) THIN FILM MAGNETIC HEAD, HEAD GIMBAL ASSEMBLY, AND HARD DISK DRIVE

(75) Inventors: Noriaki Kasahara, Tokyo (JP); Nozomu Hachisuka, Tokyo (JP)

(73) Assignee: TDK Corporation, Tokyo (JP)

( * ) Notice: Subject to any disclaimer, the term of this patent is extended or adjusted under 35 U.S.C. 154(b) by 469 days.

(21) Appl. No.: 11/214,711

(22) Filed: Aug. 31, 2005

(65) Prior Publication Data

US 2006/0098349 A1     May 11, 2006

(30) Foreign Application Priority Data

Nov. 8, 2004    (JP)   ............... 2004-323197

(51) Int. Cl.
     *G11B 5/00*      (2006.01)
     *G11B 5/33*      (2006.01)
     *G11B 5/127*      (2006.01)

(52) U.S. Cl. .................. 360/317; 360/128; 360/319

(58) Field of Classification Search .............. 360/317, 360/128, 319

See application file for complete search history.

(56) References Cited

U.S. PATENT DOCUMENTS

| | | | | |
|---|---|---|---|---|
| 5,793,578 A | * | 8/1998 | Heim et al. | ............... 360/125.4 |
| 6,963,470 B2 | * | 11/2005 | Sato | ............... 360/125.42 |
| 2001/0037160 A1 | | 11/2001 | Kumata | |
| 2003/0039067 A1 | * | 2/2003 | Hsiao et al. | ................. 360/126 |
| 2004/0027719 A1 | * | 2/2004 | Gider et al. | ................. 360/128 |
| 2004/0246630 A1 | * | 12/2004 | Otomo | ..................... 360/317 |
| 2005/0174685 A1 | * | 8/2005 | Sasaki | ..................... 360/126 |
| 2005/0190495 A1 | * | 9/2005 | Lille | ..................... 360/128 |

FOREIGN PATENT DOCUMENTS

| | | |
|---|---|---|
| JP | 11-31311 | 2/1999 |
| JP | 2001-291834 | 10/2001 |
| JP | 2003331404 A | * 11/2003 |

* cited by examiner

*Primary Examiner*—Andrea Wellington
*Assistant Examiner*—Adam B Dravininkas
(74) *Attorney, Agent, or Firm*—Oblon, Spivak, McClelland, Maier & Neustadt, P.C.

(57) ABSTRACT

In a thin film magnetic head of the present invention, lead formation patterns of a first lead for connection between a lower shield layer and a first extraction electrode portion and a second lead for connection between an upper shield layer and a second extraction electrode portion are each formed so as not to have an overlapping portion with a heatsink layer but to bypass the heatsink layer when observing from the upper shield layer side toward the lower shield layer in a transparent state in plan view. Therefore, it is possible to increase an effect of heat radiation to the substrate side on the basis of the presence of the heatsink layer to thereby limit propagation of heat to a magnetoresistive effect layer as much as possible and further to achieve a drastic improvement in recording and reproducing characteristics at high recording frequencies, i.e. frequency characteristics (f characteristics) in a high frequency region.

12 Claims, 16 Drawing Sheets

PRIOR ART

THIN FILM MAGNETIC HEAD, HEAD GIMBAL ASSEMBLY, AND HARD DISK DRIVE

BACKGROUND OF THE INVENTION

1. Field of the Invention

The present invention relates to a thin film magnetic head comprising a read magnetic head element of a CPP structure for reading as a signal a magnetic field strength recorded on a magnetic recording medium or the like, and further relates to a head gimbal assembly and a hard disk drive each including such a thin film magnetic head.

2. Description of the Related Art

In recent years, following the improvement in areal recording density of hard disk drives, improvement in performance of thin film magnetic heads has been required. As the thin film magnetic heads, use has been widely made of composite thin film magnetic heads each having a structure wherein a reproducing head comprising a read magnetic head element dedicated for reading and a recording head comprising an induction-type electromagnetic transducer element dedicated for writing are stacked in layers on a substrate.

The read magnetic head elements can be roughly classified into two types depending on in which direction a current (sense current) for detection of a magnetic field flows with respect to an element stacking direction of the stacked element structure.

Specifically, they are roughly classified into a CIP (Current In Plane) element in which the current flows along the stacked layer planes of the stacked element structure and a CPP (Current Perpendicular to Plane) element in which the current flows in the stacking direction (perpendicular direction) of the stacked element structure.

A CIP-GMR (Giant MagnetoResistive) element can be cited as the former element, while, a CPP-GMR element or a CPP-TMR (Tunnel MagnetoResistive) element can be cited as the latter element.

Particularly, the magnetic head having the latter CPP read magnetic head element is a head aimed at by the present invention and has a structure in which upper and lower surfaces of the element are sandwiched between a lower shield layer and an upper shield layer. Normally, the lower shield layer and the upper shield layer also function as electrodes, wherein a voltage is applied across the lower shield layer and the upper shield layer so that a sense current flows in the stacking direction (perpendicular direction) of the element.

Presently, as a structure generally used for a magnetic head, there is employed a shield shape in which upper and lower shield layers shielding a read magnetic head element each have a length in an MR height direction (an inward depth direction perpendicular to an ABS (Air Bearing Surface)) which is shorter than a width thereof. This is because magnetic domains of the shield layer are made stable by setting the shape of the shield layer laterally long, thereby preventing occurrence of noise which is otherwise caused by coupling between domain wall movement of the shield layer and a free layer due to magnetic flux from a magnetic recording medium at the time of a read (reproduction) operation.

On the other hand, in the magnetic head structure, for example, at the time of signal writing, there is generation of Joule heat from a coil layer in an induction-type electromagnetic transducer element and heat caused by eddy current loss from upper and lower magnetic layers and thus there may occur a so-called TPTP (Thermal Pole Tip Protrusion) phenomenon in which an overcoat layer covering the whole element is heat expanded due to such generated heat so that the magnetic head element protrudes toward the surface of a magnetic disk. When the shield layers each having the short length in the MR height direction are employed as described above, the area of about half the coil layer is a region where no shield material exists thereunder so that the influence of the TPTP phenomenon significantly appears. By disposing a heatsink under the coil layer, it becomes possible to release the heat to the AlTiC side to thereby suppress the TPTP phenomenon. However, it is necessary to limit the propagation of the heat to the magnetoresistive effect layer (element) as much as possible to thereby keep the signal reading capability.

Further, with respect to a yearly increasing demand for higher recording densities in magnetic heads, there is required a drastic improvement in recording and reproducing characteristics at high recording frequencies, i.e. frequency characteristics (f characteristics) in a high frequency region.

The present invention has been conceived under these circumstances and has an object to provide a thin film magnetic head that can limit the propagation of heat to a magnetoresistive effect layer as much as possible by increasing an effect of heat radiation to the substrate side and, further, that can achieve a drastic improvement in recording and reproducing characteristics at high recording frequencies, i.e. frequency characteristics (f characteristics) in a high frequency region, and to further provide a head gimbal assembly and a hard disk drive each comprising such an improved thin film magnetic head.

SUMMARY OF THE INVENTION

For accomplishing the foregoing object, according to one aspect of the present invention, there is obtained a thin film magnetic head comprising a substrate; a lower shield layer formed on the substrate; an upper shield layer formed on the lower shield layer; a read magnetic head element of a CPP (Current Perpendicular to Plane) structure interposed between the lower shield layer and the upper shield layer; a heatsink layer formed at a rearward portion (in a direction away from an ABS serving as a recording/reproduction-side surface) of the lower shield layer and the upper shield layer; a first extraction electrode portion and a second extraction electrode portion formed at a further rearward portion (in the direction away from the ABS serving as the recording/reproduction-side surface) of the heatsink layer; a first lead for connection between the lower shield layer and the first extraction electrode portion; and a second lead for connection between the upper shield layer and the second extraction electrode portion, wherein, when observing from the upper shield layer side toward the lower shield layer in a transparent state in plan view, formation patterns of the first lead and the second lead are each formed so as not to have an overlapping portion with the heatsink layer but to bypass the heatsink layer.

As a preferred mode of the present invention, it is configured such that the heatsink layer has a stack structure comprising a lower heatsink portion having the same composition as the lower shield layer and an upper heatsink portion having the same composition as the upper shield layer, and the lower heatsink portion and the upper heatsink portion are formed so as to be separated from the lower shield layer and the upper shield layer.

As a preferred mode of the present invention, it is configured such that the first lead connects between an exposed connecting portion of the lower shield layer and the first extraction electrode portion to thereby achieve electrical conduction between the lower shield layer and the first extraction electrode portion and that the second lead connects between a connecting portion on an insulating layer formed on the lower shield layer and the second extraction electrode portion and then the upper shield layer is formed so that a connecting portion of the second lead located at the connecting portion on the insulating layer is connected to the upper shield layer, thereby achieving electrical conduction between the upper shield layer and the second extraction electrode portion.

As a preferred mode of the present invention, it is configured such that the first extraction electrode portion has a stack structure comprising a first lower electrode layer portion having the same composition as the lower shield layer and a first upper electrode layer portion having the same composition as the upper shield layer and is formed so as to be separated from the heatsink layer and that the second extraction electrode portion has a stack structure comprising a second lower electrode layer portion having the same composition as the lower shield layer and a second upper electrode layer portion having the same composition as the upper shield layer and is formed so as to be separated from the heatsink layer.

As a preferred mode of the present invention, it is configured such that the read magnetic head element of the CPP structure is a CPP-GMR (Giant MagnetoResistive) element or a CPP-TMR (Tunnel MagnetoResistive) element.

As a preferred mode of the present invention, it is configured such that the lower shield layer and the upper shield layer have a function of shielding magnetism from the exterior and further have a function as electrodes for causing a current to flow through the read magnetic head element of the CPP structure.

According to another aspect of the present invention, there is obtained a head gimbal assembly comprising a slider including the foregoing thin film magnetic head and disposed so as to confront a recording medium, and a suspension elastically supporting the slider.

According to another aspect of the present invention, there is obtained a hard disk drive comprising a slider including the foregoing thin film magnetic head and disposed so as to confront a disc-shaped recording medium driven to be rotated, and a positioning device supporting the slider and positioning the slider relative to the recording medium.

DETAILED DESCRIPTION OF THE INVENTION

Now, the best mode for carrying out the present invention will be described in detail hereinbelow with reference to the accompanying drawings.

Figure 1:
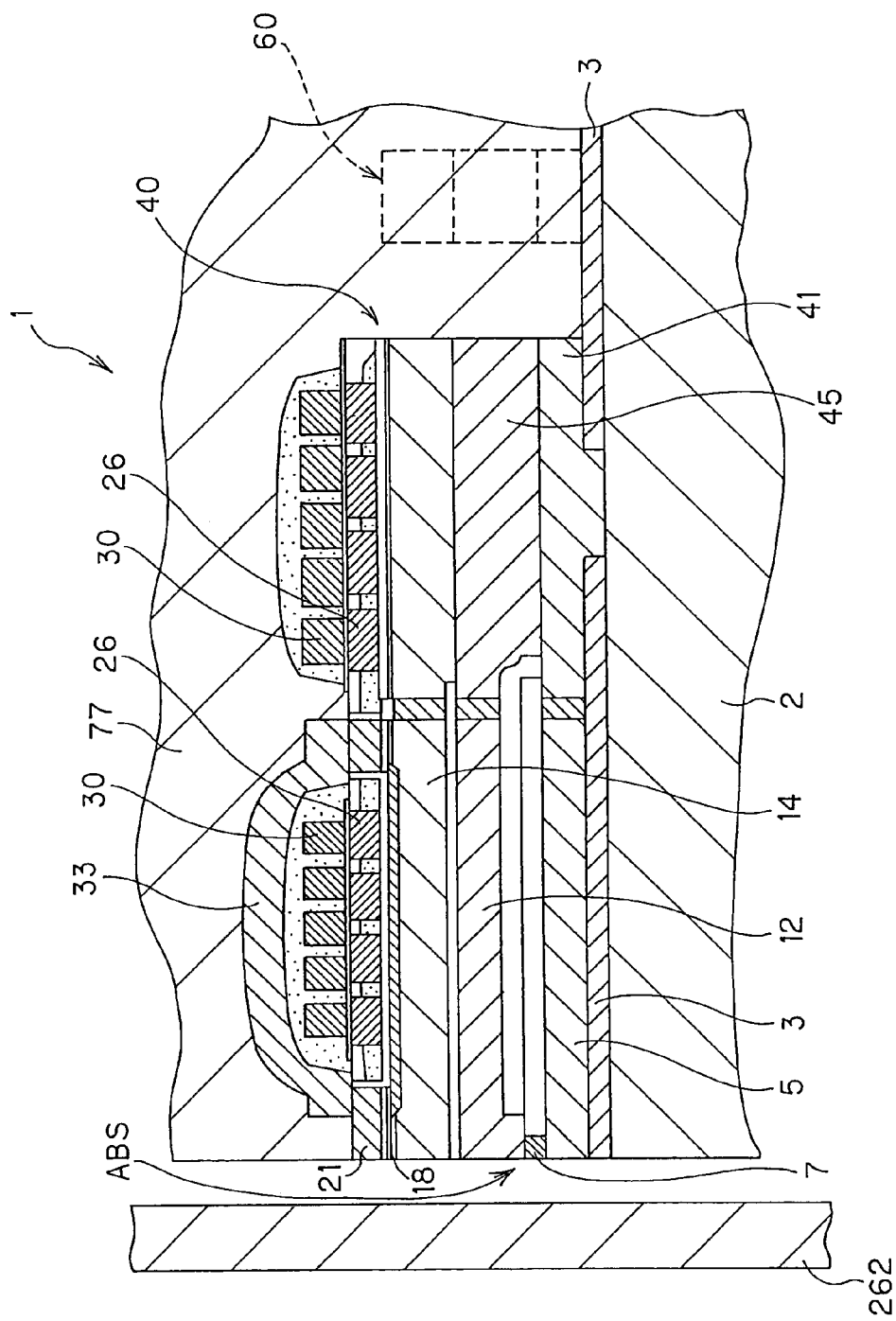
FIG. 1 is a diagram for explaining a schematic structure of a thin film magnetic head according to a preferred embodiment of the present invention, which shows a section of the thin film magnetic head perpendicular to an ABS (Air Bearing Surface) and a substrate.
Figure 2:
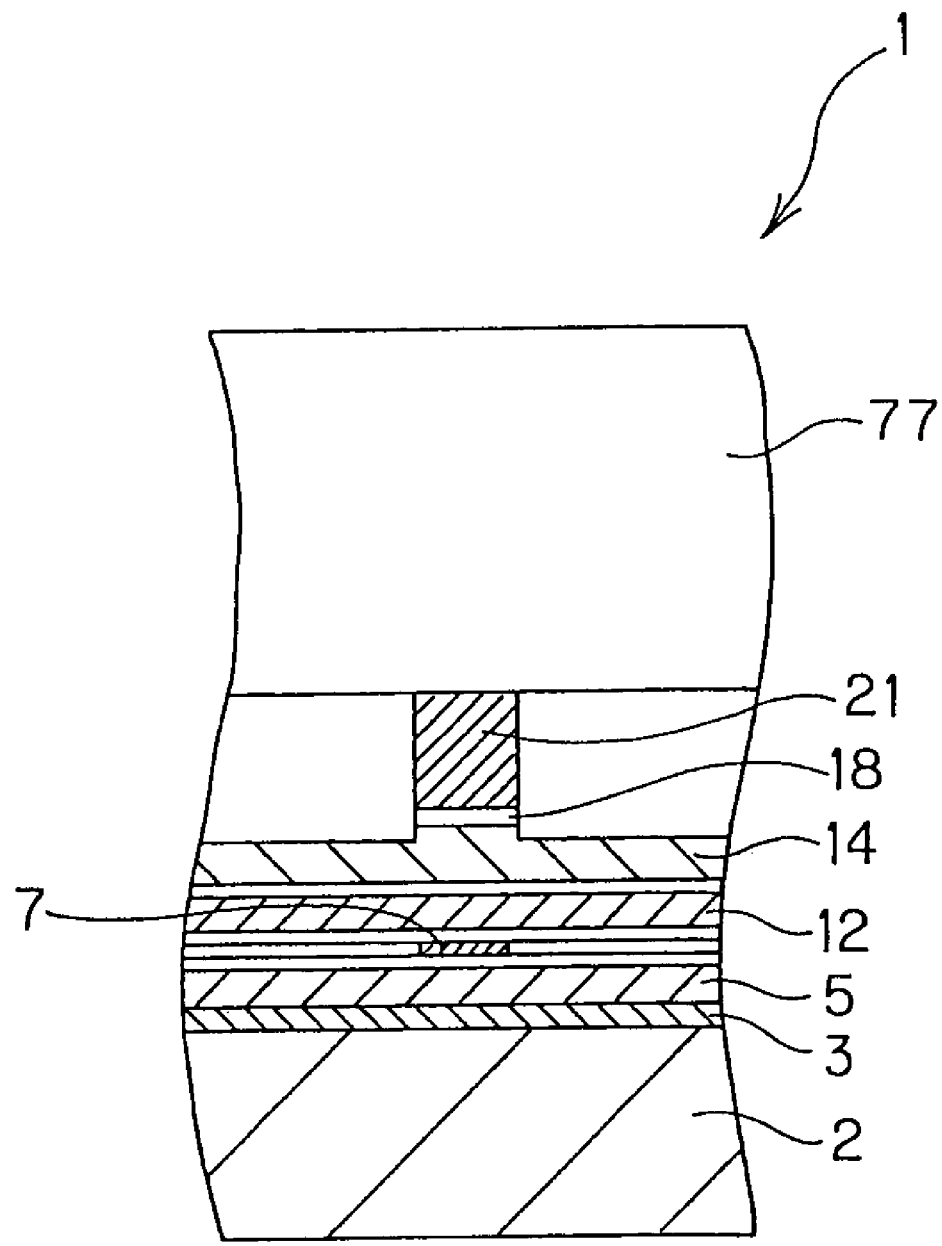
FIG. 2 is a diagram, as seen from the ABS side of the thin film magnetic head, for explaining a structure of the thin film magnetic head according to the preferred embodiment of the present invention.

FIG. 1 is a diagram for explaining a schematic structure of a thin film magnetic head according to a preferred embodiment of the present invention, which schematically shows a section of the thin film magnetic head perpendicular to an ABS (Air Bearing Surface) facing a magnetic recording medium and to a substrate. FIG. 2 is a diagram, as seen from the ABS side of the thin film magnetic head, for explaining a structure of the thin film magnetic head according to the preferred embodiment of the present invention.

As shown in these figures, a thin film magnetic head 1 of the present invention comprises a substrate 2 (normally, a so-called slider substrate), an underfilm 3 normally formed on the substrate 2, a lower shield layer 5 formed on the underfilm 3, and an upper shield layer 12 formed on the lower shield layer 5 and, between the lower shield layer 5 and the upper shield layer 12, a read magnetic head element 7 of a CPP (Current Perpendicular to Plane) structure is interposed.

The lower shield layer 5 and the upper shield layer 12 are formed so as to mainly exhibit a function as electrodes for causing a sense current to flow in the stacking direction with respect to the read magnetic head element 7 of the CPP structure and a function of magnetic shielding with respect to the read magnetic head element 7.

Further, over the upper shield layer 12 is formed a lower magnetic pole layer 14 for a write magnetic head element, i.e. for constituting an induction-type electromagnetic transducer element dedicated for writing. In combination with an upper magnetic pole layer (symbols 21, 33, etc.) including a pole 21, the lower magnetic pole layer 14 forms a substantially closed magnetic circuit for writing via a gap layer 18 interposed therebetween. Normally, this lower magnetic pole layer 14 also exhibits a magnetic shielding function.

There is no particular limitation to the number of thin film coil layers for magnetic induction of the write magnetic head element but, normally, a two-layer stacked coil structure 26, 30 is employed. The two-layer stacked coil structure will be easily understood by a time-domain explanation of manufacturing processes which will be given later.

As shown in FIG. 1, during a write or read operation, the thin film magnetic head 1 is flying over the surface of a rotating magnetic disk 262 hydrodynamically with a predetermined gap therebetween.

Further, between the lower shield layer 5 and the read magnetic head element 7 and between the read magnetic head element 7 and the upper shield layer 12, a gap layer made of Ta or the like is normally formed. In FIG. 1, symbol 77 denotes an overcoat.

The thin film magnetic head 1 of the present invention comprises a heatsink layer 40 for releasing heat generated in the head to the substrate 2 side. The heatsink layer 40 is formed at a rearward portion (in a direction away from the ABS serving as a recording/reproduction-side surface) of the lower shield layer 5, the upper shield layer 12, and the lower magnetic pole layer 14. The heatsink layer 40 has a stack structure comprising a lower heatsink portion 41 having the same composition as the lower shield layer 5 and an upper heatsink portion 45 having the same composition as the upper shield layer 12. Further, the lower heatsink portion 41 and the upper heatsink portion 45 are formed so as to be separated from the lower shield layer 5 and the upper shield layer 12 via an insulating layer interposed therebetween. This insulating layer is preferably made of a material having a low thermal conductivity, such as alumina or silicon oxide.

It is desirable that the lower heatsink portion 41 and the upper heatsink portion 45 be formed simultaneously with the formation of the lower shield layer 5 and the upper shield layer 12, respectively. This is for forming the heatsink layer 40 efficiently and economically.

The most characteristic main part of the thin film magnetic head 1 of the present invention is not shown in FIG. 1 because its definite overall structure cannot be sufficiently described in the sectional view of FIG. 1.

To give an outline of the main part in advance by the use of only a sentence (for details, see later description about manufacturing processes for the main part structure shown in FIGS. 8 to 17), a first extraction electrode portion 50 and a second extraction electrode portion 60 are formed at a further rearward portion (in the direction away from the ABS serving as the recording/reproduction-side surface) of the heatsink layer 40, and the lower shield layer 5 and the first extraction electrode portion 50 are connected together by a first lead 71 while the upper shield layer 12 and the second extraction electrode portion 60 are connected together by a second lead 75.

Further, when observing from the upper shield layer 12 side toward the lower shield layer 5 in a transparent state in plan view, formation patterns of those leads are each formed so as not to have an overlapping portion with the heatsink layer 40 but to bypass the heatsink layer 40.

In order to enable easy and definite understanding of such a main part structure of the present invention, the manufacturing processes for the main part structure will be described hereinbelow.

Processes of Manufacturing Main Part Structure of Thin Film Magnetic Head of the Present Invention Referring to FIGS. 8 to 17, the processes of manufacturing the main part structure of the thin film magnetic head of the present invention will be described in sequence.

In each of the figures, a diagram shown at (A) in the upper part of the drawing sheet is a plan view schematically showing a device itself, a diagram shown at (B) in the middle part of the drawing sheet is a schematic sectional view taken along line α-α' in the plan view shown at (A), and a diagram shown at (C) in the lower part of the drawing sheet is a schematic sectional view taken along line β-β' in the plan view shown at (A).

Note that the scales of the diagram shown at (B) and the diagram shown at (C) are not the same.

(1) Formation of Lower Shield (Electrode) Layer

Figure 8A:
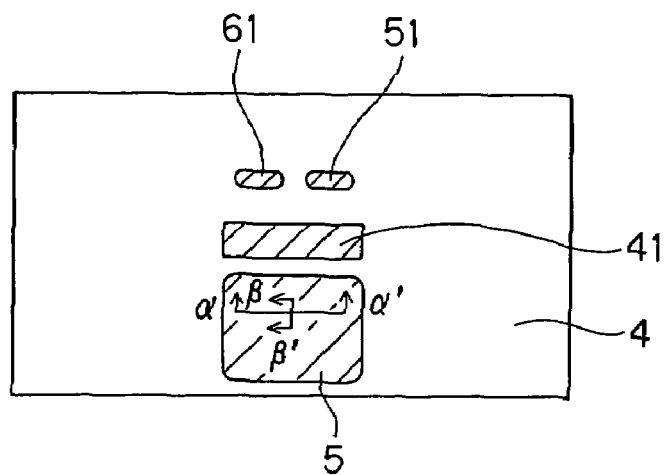
FIG. 8, (A) is a plan view for explaining processes of manufacturing a main part structure of a thin film magnetic head of the present invention, while FIG. 8, (B) and FIG. 8, (C) are schematic sectional views in predetermined directions of FIG. 8, (A), respectively.
Figure 8B:
Figure 8C:

As shown in FIG. 8, (A) to (C), for example, an $Al_2O_3$ underfilm is formed on a slider substrate made of an AlTiC material and, on this underfilm, a predetermined pattern made of a material of a lower shield (electrode) layer is formed.

Specifically, as shown in FIG. 8, (A) to (C), an electrode underfilm for plating is formed over the whole surface, then a lower shield layer 5, a lower heatsink portion 41, a first lower electrode layer portion 51, and a second lower electrode layer portion 61 of a magnetic head are formed according to a photoresist technique and, after performing plating and stripping a resist, the electrode underfilm is removed. Thereafter, an $Al_2O_3$ insulating film is formed and then a CMP treatment is carried out.

Through the foregoing processing, as shown in FIG. 8, (A), the lower shield layer 5, the lower heatsink portion 41, the first lower electrode layer portion 51, and the second lower electrode layer portion 61 of the magnetic head are formed of the same material in the state where they are separated from each other by the insulating film 4. Note that, in the sectional views of FIG. 8, (B) and (C), illustration of the substrate and the underfilm is omitted (the same shall apply to the corresponding (B) and (C) diagrams hereinafter).

(2) Formation of CPP-Structure Read Magnetic Head Element Film

Figure 9A:
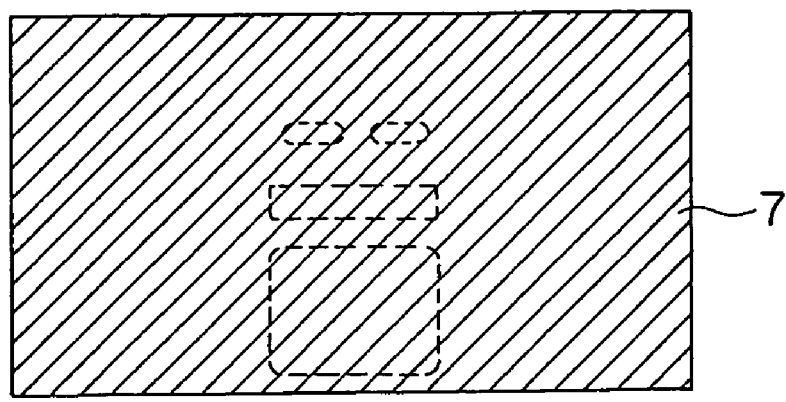
FIG. 9, (A) is a plan view for explaining the processes of manufacturing the main part structure of the thin film magnetic head of the present invention, while FIG. 9, (B) and FIG. 9, (C) are schematic sectional views in the predetermined directions of FIG. 9, (A), respectively.
Figure 9B:
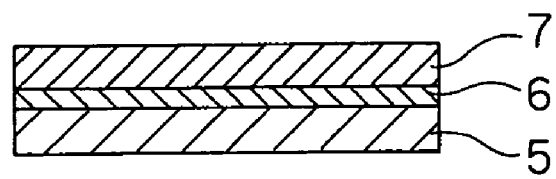
Figure 9C:
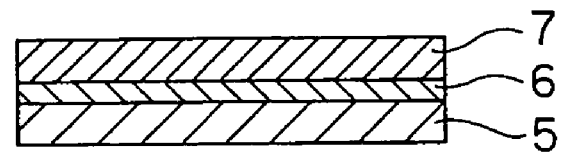

As shown in FIG. 9, (A) to (C), a gap layer 6 is formed and then, for example, a TMR film 7 being a CPP-structure read magnetic head element film is formed over the whole surface (see particularly FIG. 9, (B) and (C)). Although the TMR film normally has a multilayer film structure, it is simplified as a single-layer film herein.

(3) Formation of Connecting Portion

Figure 10A:
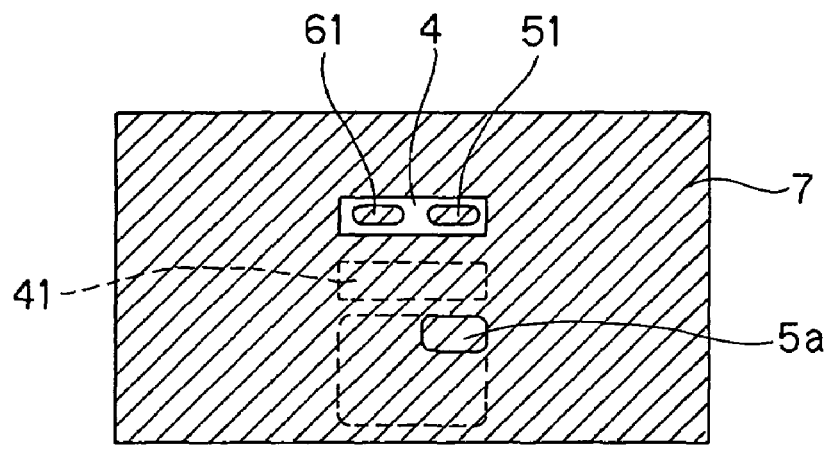
FIG. 10, (A) is a plan view for explaining the processes of manufacturing the main part structure of the thin film magnetic head of the present invention, while FIG. 10, (B) and FIG. 10, (C) are schematic sectional views in the predetermined directions of FIG. 10, (A), respectively.
Figure 10B:
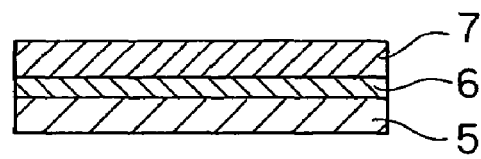
Figure 10C:
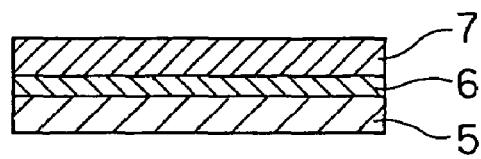

As shown in FIG. 10, (A) to (C), by performing a predetermined pattern photoresist technique and carrying out milling to strip a resist, a corner portion 5a (exposed connecting portion 5a) of the lower shield layer 5, the first lower electrode layer portion 51, and the second lower electrode layer portion 61 of the magnetic head are exposed, respectively, as particularly shown in FIG. 10, (A).

(4) Photoresist Formation for Track Width Formation

Figure 11A:
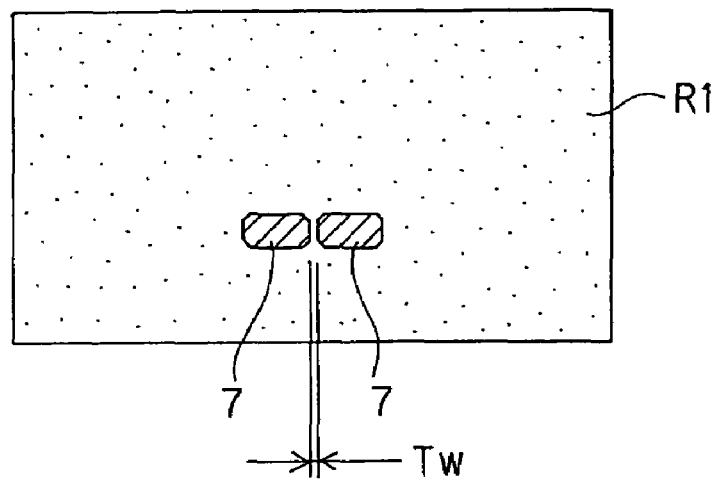
FIG. 11, (A) is a plan view for explaining the processes of manufacturing the main part structure of the thin film magnetic head of the present invention, while FIG. 11, (B) and FIG. 11, (C) are schematic sectional views in the predetermined directions of FIG. 11, (A), respectively.
Figure 11B:
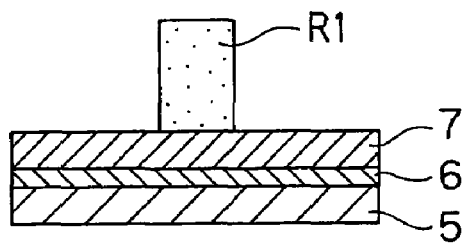
Figure 11C:
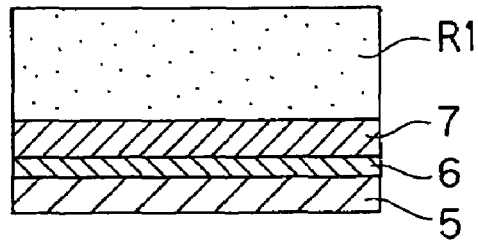

As shown in FIG. 11, (A) to (C), a predetermined pattern photoresist technique is performed to thereby form a photoresist R1 of a predetermined pattern so as to define a track width Tw of the TMR element (formation of a mask pattern).

(5) Track Width Formation

Figure 12A:
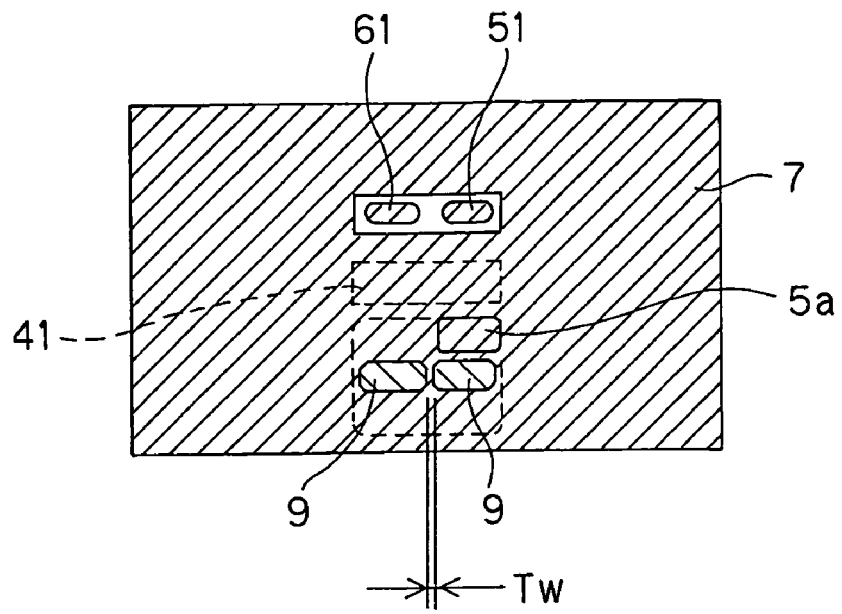
FIG. 12, (A) is a plan view for explaining the processes of manufacturing the main part structure of the thin film magnetic head of the present invention, while FIG. 12, (B) and FIG. 12, (C) are schematic sectional views in the predetermined directions of FIG. 12, (A), respectively.
Figure 12B:
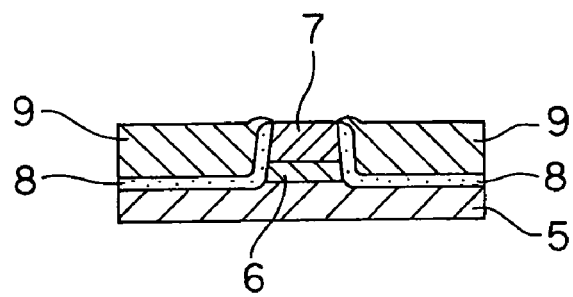
Figure 12C:
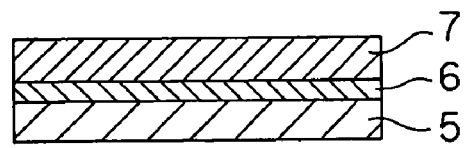

As shown in FIG. 12, (A) to (C), portions of the TMR film 7 partly exposed to define the track width Tw of the TMR element (see FIG. 11, (A)) are milled, then an insulating film 8 and a hard magnetic film 9 (a bias applying layer for the TMR element) are formed in order at the milled portions, and then lift-off is performed. After the lift-off, the corner portion 5a (exposed connecting portion 5a) of the lower shield layer 5, the first lower electrode layer portion 51, and the second lower electrode layer portion 61 are in the state where they are exposed, respectively.

(6) Photoresist Formation for MR Height Formation

Figure 13A:
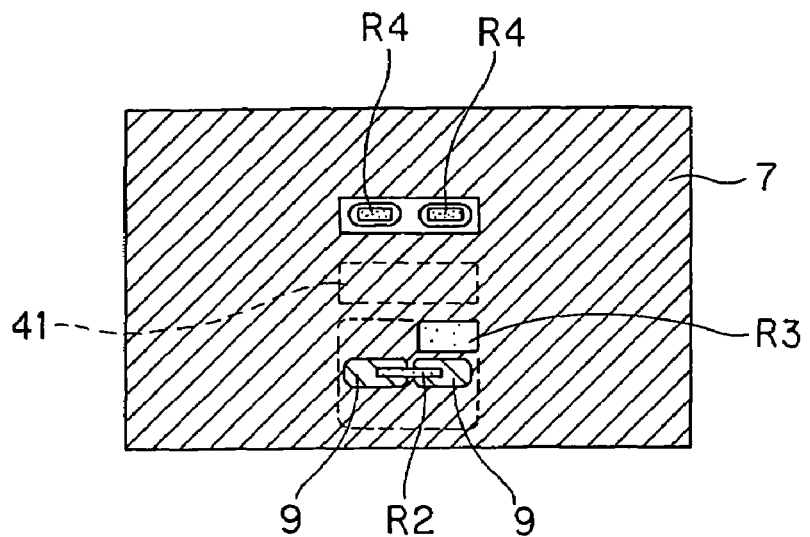
FIG. 13, (A) is a plan view for explaining the processes of manufacturing the main part structure of the thin film magnetic head of the present invention, while FIG. 13, (B) and FIG. 13, (C) are schematic sectional views in the predetermined directions of FIG. 13, (A), respectively.
Figure 13B:
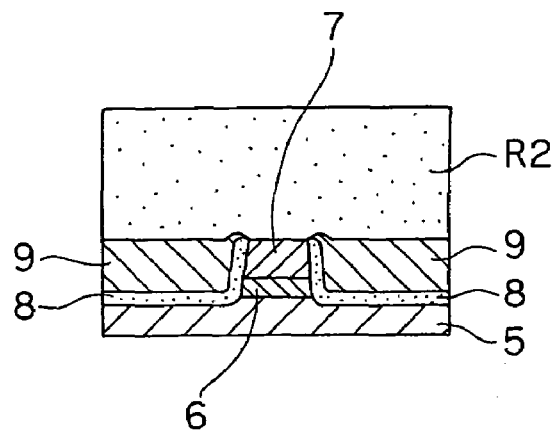
Figure 13C:
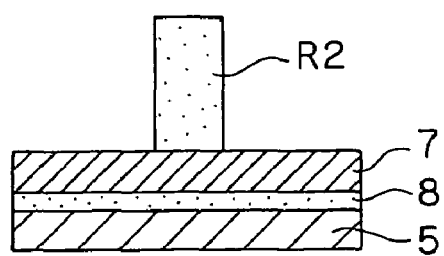

As shown in FIG. 13, (A) to (C), a photoresist R2 of a predetermined pattern is formed so as to define a so-called MR height of the TMR element, while, a photoresist R3 is formed on the corner portion 5a of the lower shield layer 5 and photoresists R4 are formed on the first lower electrode layer portion 51 and the second lower electrode layer portion 61 (formation of a mask pattern).

(7) MR Height Formation

Figure 14A:
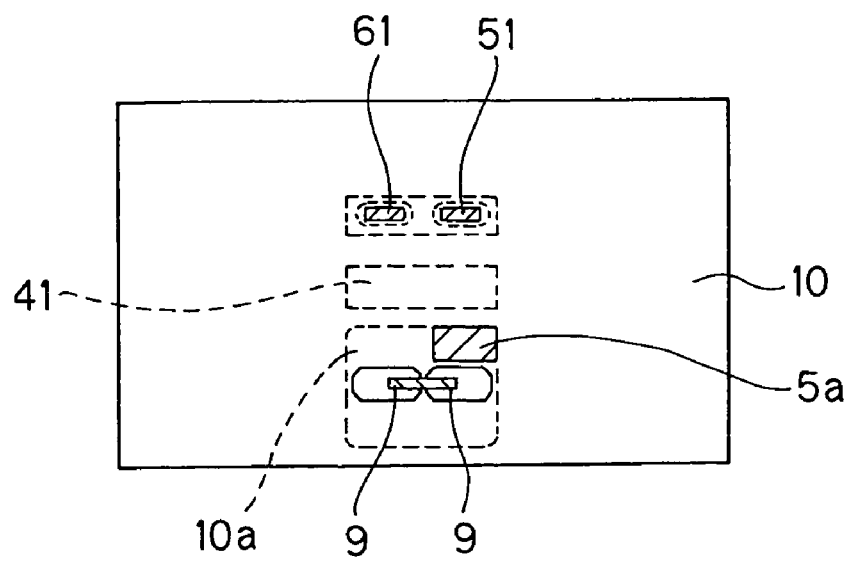
FIG. 14, (A) is a plan view for explaining the processes of manufacturing the main part structure of the thin film magnetic head of the present invention, while FIG. 14, (B) and FIG. 14, (C) are schematic sectional views in the predetermined directions of FIG. 14, (A), respectively.
Figure 14B:
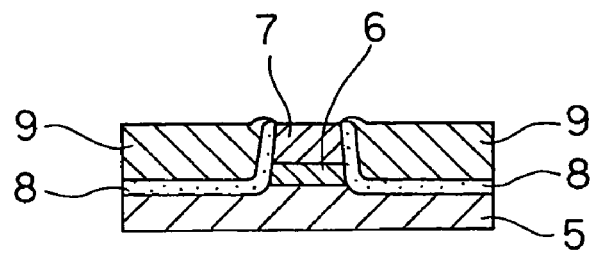
Figure 14C:
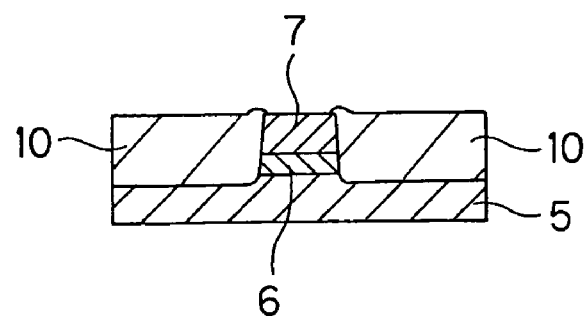

As shown in FIG. 14, (A) to (C), milling is carried out (portions other than the mask in FIG. 13, (A) are milled) so as to define the so-called MR height of the TMR element, thereby leaving the TMR film 7 only at the portion necessary for the element, and thereafter, an insulating film 10 of alumina or the like is formed at the milled portions and then lift-off is performed.

After the lift-off, as shown in FIG. 14, (A), the corner portion 5a (exposed connecting portion 5a) of the lower shield layer 5, the first lower electrode layer portion 51, and the second lower electrode layer portion 61 are in the state where they are exposed, respectively.

(8) Lead Formation

Figure 15A:
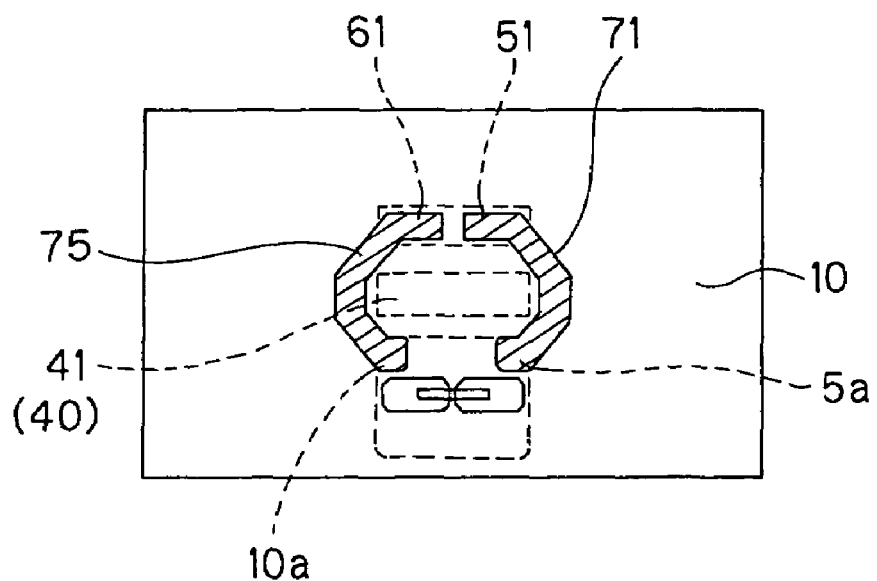
FIG. 15, (A) is a plan view for explaining the processes of manufacturing the main part structure of the thin film magnetic head of the present invention, while FIG. 15, (B) and FIG. 15, (C) are schematic sectional views in the predetermined directions of FIG. 15, (A), respectively.
Figure 15B:
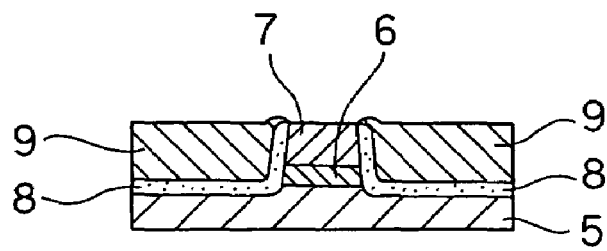
Figure 15C:
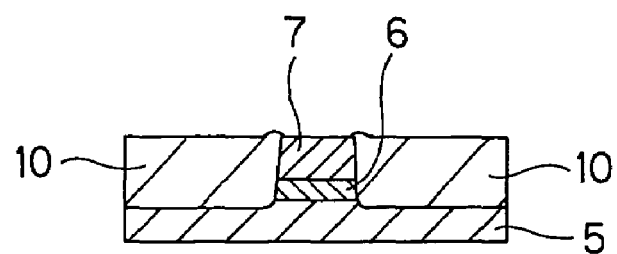

As shown in FIG. 15, (A) to (C), a photoresist of a predetermined pattern is formed so as to enable formation of a first lead 71 and a second lead 75 (formation of a mask pattern is not shown), then the first lead 71 and the second lead 75 are formed, and then lift-off is performed (the state of FIG. 15, (A)).

When forming the first lead 71 and the second lead 75, it is important that when observing from the upper shield layer 12 side toward the lower shield layer 5 in a transparent state in plan view (corresponding to the state where FIG. 15, (A) is seen from above in a direction perpendicular to the drawing sheet), formation patterns of those leads each be formed so as not to have an overlapping portion with the heatsink layer 40 but to bypass the heatsink layer 40. If "a transparent state in plan view" is defined by another expression, it may be a state where transmission observation is performed in the element stacking direction from the stacked layer plane of the element.

It is desirable that the bypass length be as short as possible while avoiding occurrence of an overlapping portion with the heatsink layer 40.

In the state after the lift-off as shown in FIG. 15, (A), the first lead 71 connects between the exposed connecting portion 5a of the lower shield layer 5 (see particularly FIG. 14, (A)) and the first lower electrode layer portion 51 (see particularly FIG. 14, (A)). With this configuration, there is achieved electrical conduction between the lower shield layer 5 and the first lower electrode layer portion 51 (a component of the first extraction electrode portion 50).

The first lower electrode layer portion 51 is one of components of the first extraction electrode portion 50.

Further, in the state after the lift-off, the second lead 75 connects between a connecting portion 10a of the insulating layer 10 (see particularly FIG. 14, (A)) formed on the lower shield layer 5 and the second lower electrode layer portion 61. Because of the presence of the interposed insulating layer 10 (10a), the second lead 75 is insulated from the lower shield layer 5. The second lower electrode layer portion 61 is one of components of the second extraction electrode portion 60.

(9) Formation of Lead Connecting Portion

Figure 16A:
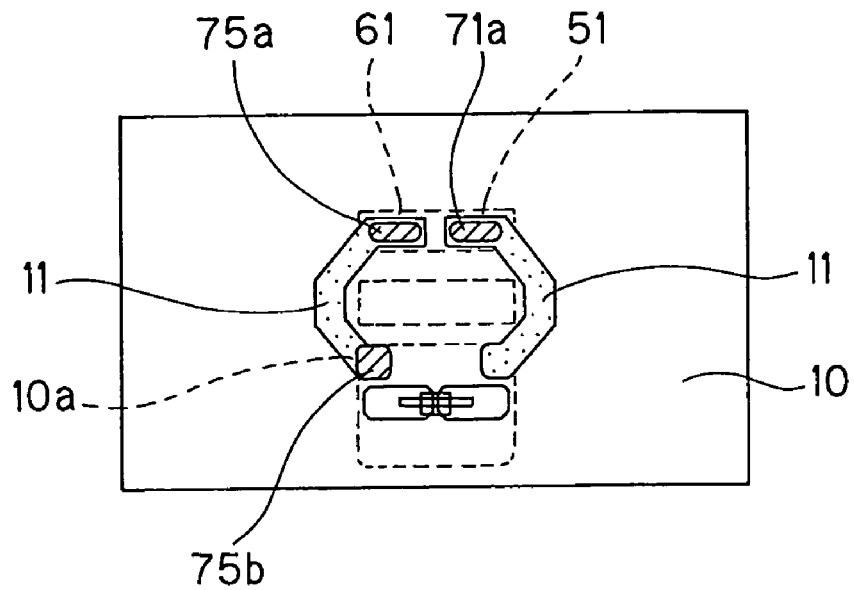
FIG. 16, (A) is a plan view for explaining the processes of manufacturing the main part structure of the thin film magnetic head of the present invention, while FIG. 16, (B) and FIG. 16, (C) are schematic sectional views in the predetermined directions of FIG. 16, (A), respectively.
Figure 16B:
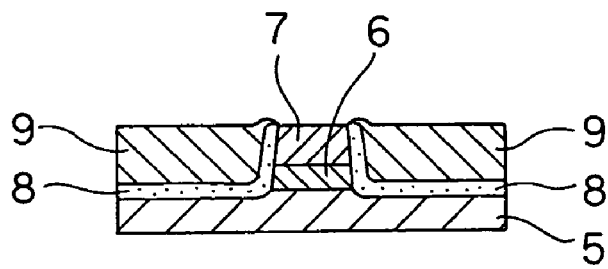
Figure 16C:
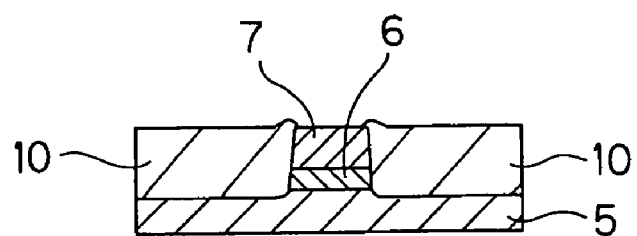

As shown in FIG. 16, (A) to (C), a photoresist is formed (formation of a mask pattern) so that a portion 71a of the first lead 71 corresponding to an overlapping position with the first lower electrode layer portion 51, a portion 75a of the second lead 75 corresponding to an overlapping position with the second lower electrode layer portion 61, and a portion 75b of the second lead 75 corresponding to an overlapping position with the connecting portion 10a of the insulating layer 10 are respectively exposed after the lift-off.

Thereafter, an insulating film 11 of, for example, SiO$_2$ is formed on other portions of the first lead 71 and the second lead 75 which should be insulated, and then lift-off is performed (the state of FIG. 16, (A)).

In the state after the lift-off as shown in FIG. 16, (A), the portion 71a of the first lead 71 located at the first lower electrode layer portion 51 is in an exposed state because there is no insulating film 11. Likewise, the portion 75a of the second lead 75 located at the second lower electrode layer portion 61 is in an exposed state because there is no insulating film 11. Further, the portion 75b of the second lead 75 corresponding to the overlapping position with the connecting portion 10a is also in an exposed state because there is no insulating film 11.

(10) Formation of Upper Shield (Electrode) Layer

Figure 17A:
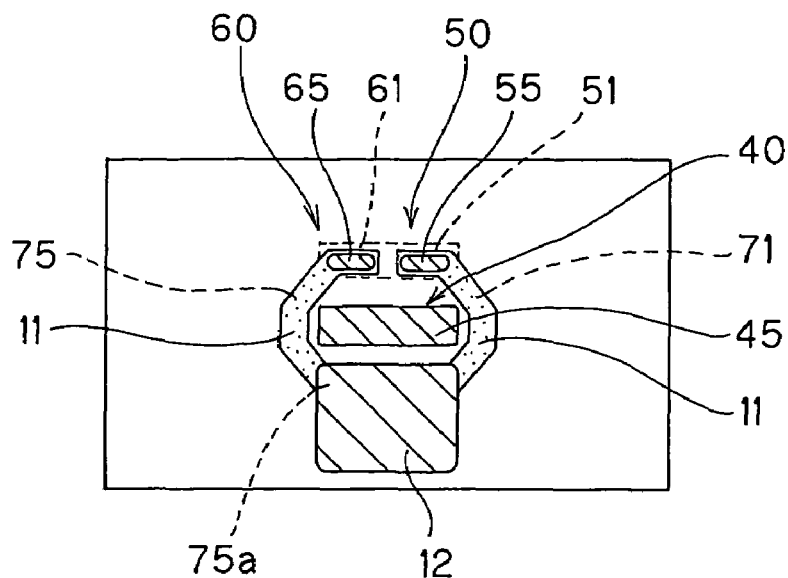
FIG. 17, (A) is a plan view for explaining the processes of manufacturing the main part structure of the thin film magnetic head of the present invention, while FIG. 17, (B) and FIG. 17, (C) are schematic sectional views in the predetermined directions of FIG. 17, (A), respectively.
Figure 17B:
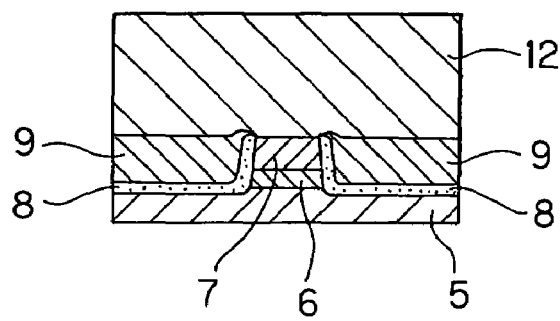
Figure 17C:
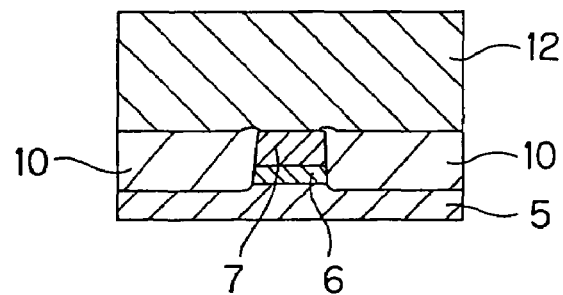

As shown in FIG. 17, (A) to (C), a photoresist technique is carried out so that the upper shield layer 12, an upper heatsink portion 45, a first upper electrode layer portion 55, and a second upper electrode layer portion 65 of the magnetic head are formed of a material of the upper shield layer (a pattern shown in FIG. 17, (A)).

By forming the upper shield layer 12 in the pattern shown in FIG. 17, (A), the exposed connecting portion 75a of the second lead 75 is connected to the upper shield layer 12 so that there is achieved electrical conduction between the upper shield layer 12 and the second lower electrode layer portion 61. The first upper electrode layer portion 55 is one of the components of the first extraction electrode portion 50. The second upper electrode layer portion 65 is one of the components of the second extraction electrode portion 60.

As described above, in the manufacturing processes for the main part structure of the thin film magnetic head on the basis of FIGS. 8 to 17, the gist of the present invention resides in that when forming the first lead 71 and the second lead 75, the lead formation patterns thereof are each formed so as not to have an overlapping portion with the heatsink layer 40 but to bypass the heatsink layer 40 in the case of observing from the upper shield layer 12 side toward the lower shield layer 5 in the transparent state in plan view. As described above, the bypass distance is preferably as short as possible.

When drawing a lead, everybody may think to connect between an extraction electrode portion and a contact hole (connecting portion) of a shield layer with the shortest linear lead. This is for making the lead length as short as possible to reduce a resistance value due to the lead as much as possible, thereby making a primary resistance change of a magnetoresistive effect element distinguished as much as possible.

In such a case, in the head structure where a heatsink is provided between the extraction electrode portion and the shield layer, the lead is sandwiched by the heatsink.

However, as a result of assiduous researches conducted by the present inventors on the lead drawing manner in the structure where the heatsink is disposed between the extraction electrode portion and the shield layer, they have reached a conclusion that setting of a lead drawing manner is required under a new concept, and have conceived the present invention.

That is, with respect to a demand for higher recording densities in magnetic heads, stable recording and reproducing characteristics at high recording frequencies (frequency characteristics: hereinafter referred to simply as "f characteristics") are required. Generally, since a reproducing head is constituted by a parallel circuit of a resistance (R) and a capacitance (C), it can be regarded as an RC low-pass filter circuit. In this case, a cutoff frequency (fc) is given by the following formula (1):

$$fc = 1/2\pi RC \text{ [Hz]} \quad (1)$$

The cutoff frequency is a frequency at which the output of the circuit becomes $1/\sqrt{2}$ with respect to an output at f=0.

Herein, the present inventors have considered that a resistance value of a reproducing head is set to a predetermined value depending on a specification per head and, in order to achieve a drastic improvement in frequency characteristics (f characteristics) in a high frequency region (GHz level), even if there occurs a disadvantage of slight increase (about 1%) in resistance based on a slight increase in length of a lead drawing pattern, an advantage derived from a collateral reduction in capacitance (C) is quite larger.

That is, the present inventors have considered that the capacitance (C) is the most important factor that can extend the frequency where the constant output can be maintained, to a higher frequency region side. The effect thereof will be seen by referring to test results of a later-described example.

Referring back to the description of the structure of the magnetic head element, as the CPP-structure read magnetic head element used in the present invention, there is cited a CPP-GMR (Giant MagnetoResistive) element or a CPP-TMR (Tunnel MagnetoResistive) element.

As the substrate 2 in the present invention, use is made of, for example, AlTiC ($Al_2O_3$—TiC).

The lower shield layer 5 and the upper shield layer 12 in the present invention are each made of, for example, FeAlSi, NiFe, CoFe, CoFeNi, FeN, FeZrN, FeTaN, CoZrNb, or CoZrTa. Each of them is formed by the sputtering method, the plating method, or the like and the thickness thereof is set to about 1.5 to 3.0 μm. The lower magnetic pole layer 14 in the present invention is made of, for example, FeAlSi, NiFe, CoFe, CoFeNi, FeN, FeZrN, FeTaN, CoZrNb, or CoZrTa. It is formed by the sputtering method, the plating method, or the like and the thickness thereof is set to about 1.5 to 5.0 μm.

Head Gimbal Assembly and Hard Disk Drive

Hereinbelow, description will be made of a head gimbal assembly and a hard disk drive according to an embodiment of the present invention.

Figure 3:
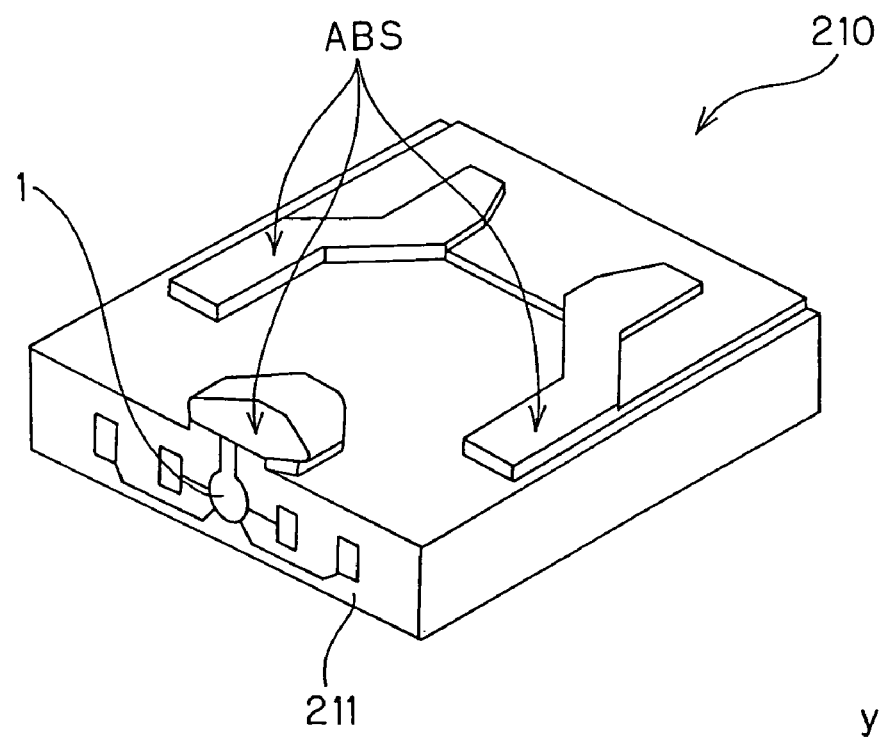
FIG. 3 is a perspective view showing a slider included in a head gimbal assembly in an embodiment of the present invention.

Referring first to FIG. 3, a slider 210 included in the head gimbal assembly will be described. In the hard disk drive, the slider 210 is disposed so as to confront a hard disk serving as a disc-shaped recording medium and driven to be rotated. The slider 210 comprises a base body 211 mainly composed of the substrate 2 and the overcoat 77 in FIG. 1.

The base body 211 has a generally hexahedral shape. One surface, among six surfaces, of the base body 211 is arranged to confront the hard disk. This one surface is formed with the ABS.

When the hard disk is rotated in a z-direction in FIG. 3, lift is generated below the slider 210 in a y-direction in FIG. 3 because of an air flow passing between the hard disk and the slider 210. This lift causes the slider 210 to rise from the surface of the hard disk. Incidentally, an x-direction in FIG. 3 represents a track traverse direction of the hard disk.

The thin film magnetic head 1 according to this embodiment is formed in the neighborhood of an end portion (lower-left end portion in FIG. 3) of the slider 210 on an air exit side thereof.

Figure 4:
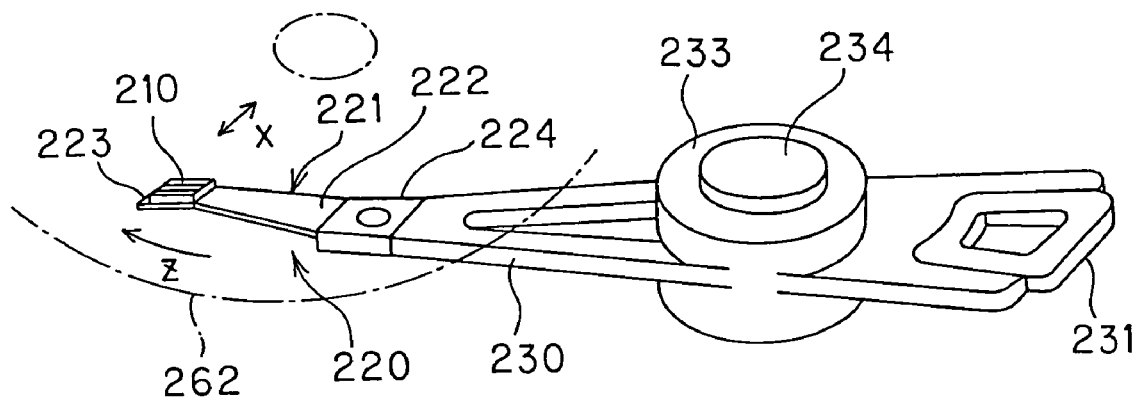
FIG. 4 is a perspective view showing a head arm assembly including the head gimbal assembly in the embodiment of the present invention.

Referring now to FIG. 4, description will be made of a head gimbal assembly 220 according to this embodiment. The head gimbal assembly 220 comprises the slider 210, and a suspension 221 elastically supporting the slider 210. The suspension 221 comprises a load beam 222 in the form of a blade spring made of, for example, stainless steel, a flexure 223 provided at one end of the load beam 222 and joined with the slider for giving a suitable degree of freedom to the slider 210, and a base plate 224 provided at the other end of the load beam 222.

The base plate 224 is adapted to be attached to an arm 230 of an actuator for moving the slider 210 in the track traverse direction x of a hard disk 262. The actuator comprises the arm 230 and a voice coil motor for driving the arm 230. In the flexure 223, a portion where the slider 210 is mounted, is provided with a gimbal portion for keeping constant a posture of the slider 210.

The head gimbal assembly 220 is attached to the arm 230 of the actuator. An assembly in which the head gimbal assembly 220 is attached to one arm 230 is called a head arm assembly. On the other hand, an assembly in which a carriage has a plurality of arms and the head gimbal assembly 220 is attached to each of the arms is called a head stack assembly.

FIG. 4 shows one example of the head arm assembly. In this head arm assembly, the head gimbal assembly 220 is attached to one end of the arm 230. To the other end of the arm 230 is attached a coil 231 forming part of the voice coil motor. At an intermediate portion of the arm 230 is provided a bearing portion 233 that is mounted on a shaft 234 for pivotally supporting the arm 230.

Figure 5:
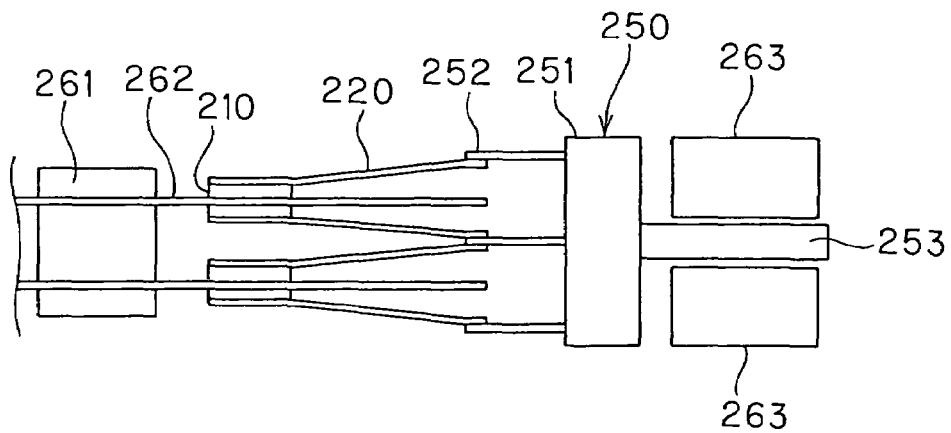
FIG. 5 is an explanatory diagram showing the main part of a hard disk drive in the embodiment of the present invention.
Figure 6:
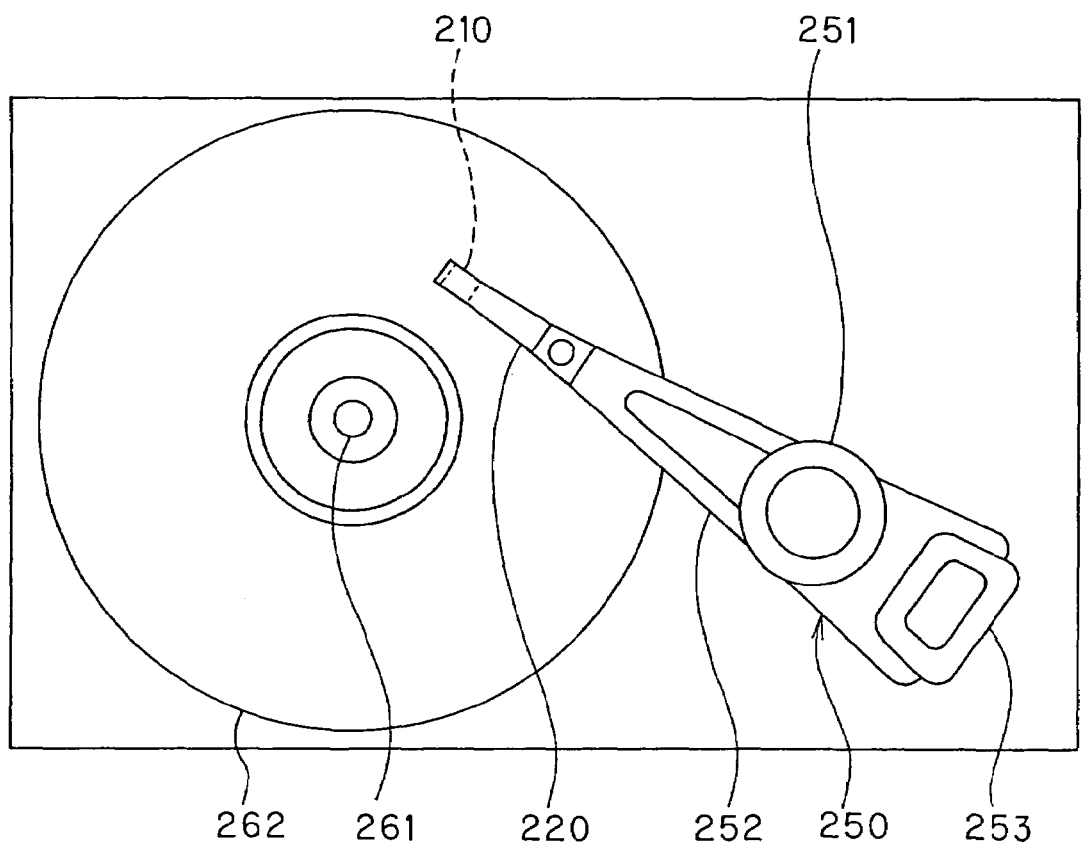
FIG. 6 is a plan view of the hard disk drive in the embodiment of the present invention.

Referring now to FIGS. 5 and 6, description will be made of one example of the head stack assembly and the hard disk drive according to this embodiment.

FIG. 5 is an explanatory diagram showing the main part of the hard disk drive, while FIG. 6 is a plan view of the hard disk drive.

A head stack assembly 250 comprises a carriage 251 having a plurality of arms 252. A plurality of head gimbal assemblies 220 are attached to the arms 252 so as to be adjacent to each other in the vertical direction with an interval therebetween. A coil 253 forming part of a voice coil motor is attached to the carriage 251 on the opposite side relative to the arms 252. The head stack assembly 250 is incorporated into the hard disk drive.

The hard disk drive has a plurality of hard disks 262 mounted on a spindle motor 261. Two sliders 210 are disposed for each of the hard disks 262 so as to confront each other with the hard disk 262 interposed therebetween. The voice coil motor has permanent magnets 263 that are disposed at positions to confront each other with the coil 253 interposed therebetween.

The head stack assembly 250 excluding the sliders 210 and the actuator correspond to a positioning device in the present invention and serve to support the sliders 210 and to position the sliders 210 relative to the hard disks 262.

In the hard disk drive according to this embodiment, the sliders 210 are moved in the track traverse direction of the hard disks 262 and positioned relative to the hard disks 262 by the use of the actuator. The thin film magnetic head included in the slider 210 records information on the hard disk 262 using the recording head element, while reproduces information recorded on the hard disk 262 using the reproducing head element.

The head gimbal assembly and the hard disk drive according to this embodiment achieve the effect like that achieved by the thin film magnetic head according to the foregoing embodiment.

Hereinbelow, a specific example will be shown to describe the structure of the thin film magnetic head of the present invention in further detail.

EXAMPLE

A thin film magnetic head sample as shown in FIGS. 1 and 2 and FIGS. 8 to 17 was prepared.

A specification of the sample was as follows.

A substrate 2 of AlTiC, an underlayer of $Al_2O_3$ having a thickness of 0.3 μm, a lower shield layer of Permalloy having a thickness of 2.0 μm, a gap of Ta having a thickness of 5 nm, a TMR element (see later description for a detailed stack structure), a hard magnetic layer (bias layer) of CoCrPt having a thickness of 23 nm, a gap of Ta having a thickness of 10 nm, an upper shield layer of Permalloy having a thickness of 1.9 μm, a separate shield gap layer of $Al_2O_3$ having a thickness of 0.2 μm, a lower magnetic pole layer of Permalloy having a thickness of 1.9 μm, and a light gap film of $Al_2O_3$ having a thickness of 0.1 μm were formed in the order named.

Further, an upper magnetic layer (pole layer) was formed of CoFeNi so that the height of an upper pole portion being a tip portion of the upper magnetic layer became 1.2 μm and the width thereof became 0.18 μm. An overcoat was formed of alumina so that the whole thickness thereof became 30 μm.

The layered structure of the TMR element was as follows.

Specifically, an antiferromagnetic layer was formed as an Ir—Mn layer having a thickness of 7 nm, a ferromagnetic layer (pinned layer) was formed as a Co—Fe layer having a thickness of 4 nm, and a tunnel barrier layer was formed as an Al oxide film. A ferromagnetic layer (free layer) was formed as a layered film of a CoFe layer having a thickness of 4 nm and a NiFe layer having a thickness of 3 nm, which were stacked in the order named from the tunnel barrier layer side.

Further, according to the manner shown in the process diagrams of FIGS. 8 to 17, a heatsink layer was formed at a rearward portion (in the direction away from the ABS serving as the recording/reproduction-side surface) of the lower shield layer, the upper shield layer, and the lower magnetic pole layer for suppressing introduction of heat generated in the head to the element side, and a first lead and a second lead were each formed so as not to have an overlapping portion with the heatsink layer but to bypass the heatsink layer.

A junction capacitance $C_{junction}$ at each of connecting portions between portions of the element body including the upper and lower shield layers and the first and second leads was derived to be 1.04 (pF).

In this example, since the first lead and the second lead are each configured so as not to have an overlapping portion with the heatsink layer as shown, for example, in FIG. 17, (A), a capacitance $_{heatsink-lead}$ between the heatsink layer and each lead is zero. Therefore, the total capacitance was 1.04 (pF).

COMPARATIVE EXAMPLE

Figure 18:
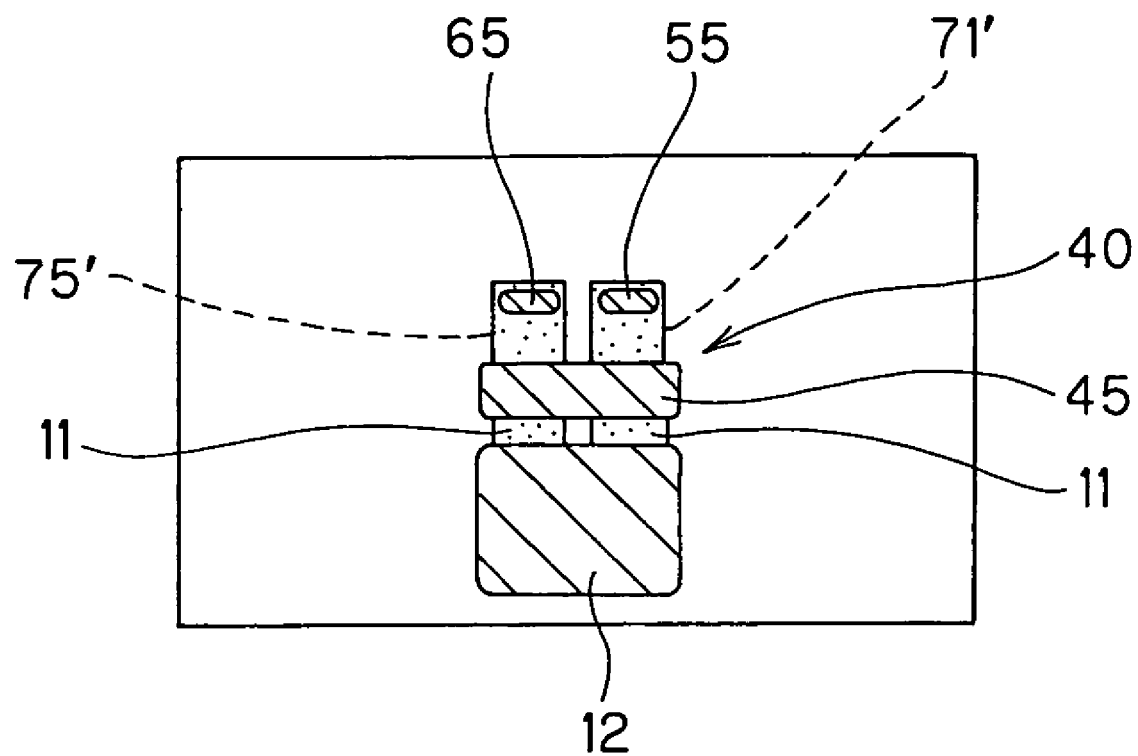
FIG. 18 is a plan view to be compared with FIG. 17, (A), wherein, when drawing leads, the leads are disposed linearly between extraction electrode portions and connecting portions (contact holes) of shield layers, respectively, so that each of the leads has the shortest length, and therefore the leads are each formed so as to have an overlapping portion with a heatsink layer in a perpendicular fashion.

In the manufacture of the foregoing example sample, the arrangement of the first lead and the second lead was changed. Specifically, as shown in a plan view of FIG. 18, when drawing first and second leads 71' and 75', the first and second leads 71' and 75' were disposed linearly between the extraction electrode portions and the connecting portions (contact holes) of the shield layers, respectively, so that each of the first and second leads 71' and 75' had the shortest length. That is, the first lead 71' and the second lead 75' were each formed so as to have an overlapping portion with the heatsink layer 40 in a perpendicular fashion.

The area of each overlapping portion was derived to be 1000 μm$^2$ and a capacitance $_{heatsink-lead}$ between the heatsink layer and the lead at each overlapping portion was 1.11 (pF). Therefore, the total capacitance was 1.04+1.11=2.15 (pF).

Figure 7:
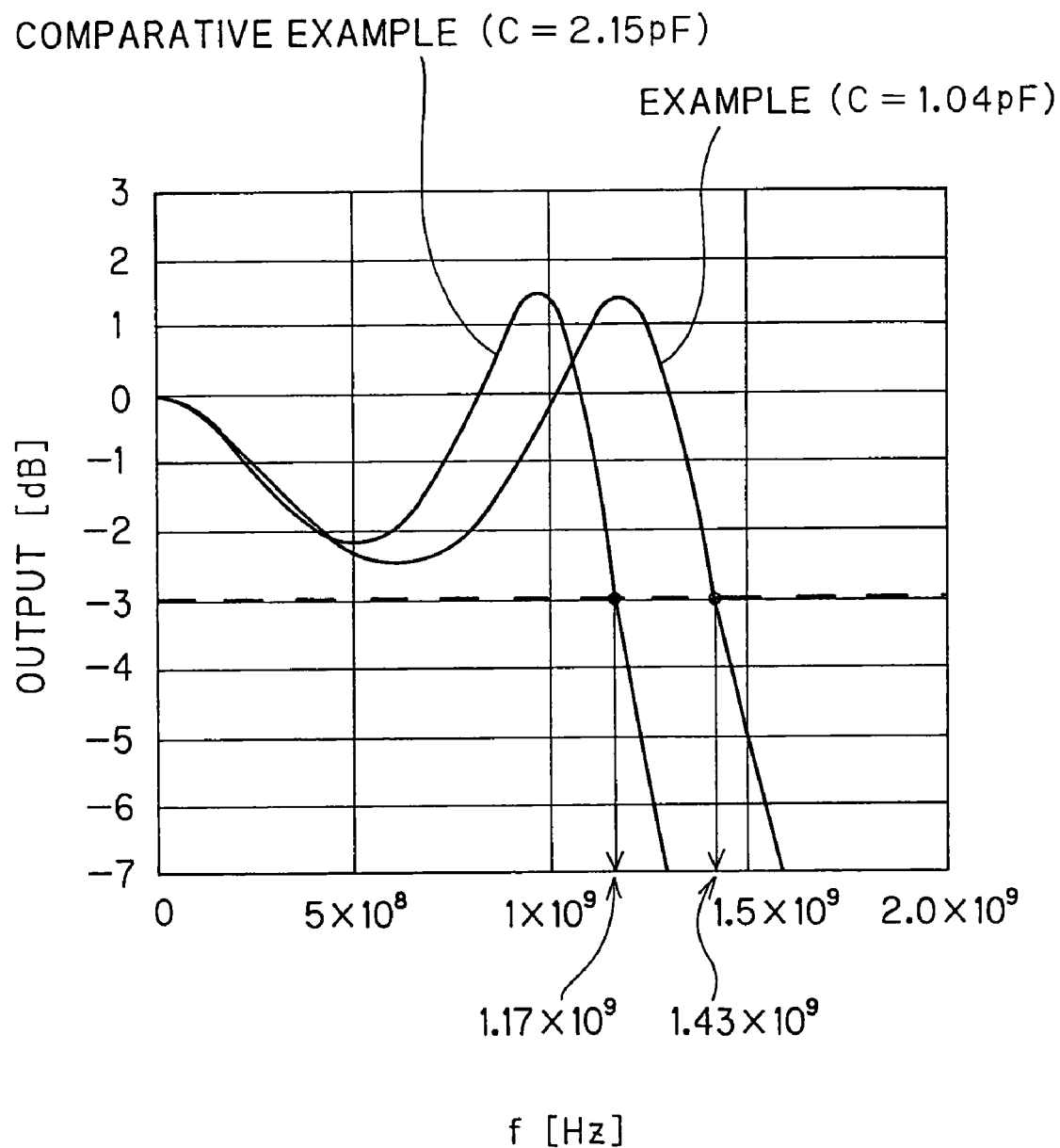
FIG. 7 is a graph showing recording/reproducing characteristics (frequency characteristics) with respect to an example sample and a comparative example sample.

With respect to the example sample and the comparative example sample thus prepared, recording/reproducing characteristics (frequency characteristics) were derived and shown in a graph of FIG. 7.

The graph of FIG. 7 shows a relationship between a frequency (f) and an output (dB) given that an output at frequency f=0 is 0 (dB). The resistance value of the TMR element was 300Ω and the capacitance and resistance of a preamplifier were 5 (pF) and 60Ω, respectively.

From the results shown in the graph of FIG. 7, it is understood that, in the example sample, since the capacitance of the reproducing head is reduced from 2.15 (pF) to 1.04 (pF) by allowing the leads to bypass the heatsink layer to thereby provide no overlapping portion, the cutoff frequency (frequency at which the output is reduced by 3 dB) is extended to a higher frequency side, i.e. from 1.17 (GHz) of the comparative example sample to 1.43 (GHz). The increase contribution rate toward the higher frequency side is about 22%.

The effects of the present invention are clear from the foregoing results.

Specifically, the present invention is a thin film magnetic head comprising a read magnetic head element of a CPP (Current Perpendicular to Plane) structure interposed between a lower shield layer and an upper shield layer, wherein a heatsink layer is formed at a rearward portion (in a direction away from an ABS serving as a recording/reproduction-side surface) of the lower shield layer and the upper shield layer, and a first extraction electrode portion and a second extraction electrode portion are formed at a further rearward portion (in the direction away from the ABS serving as the recording/reproduction-side surface) of the heatsink layer, and wherein lead formation patterns of a first lead for connection between the lower shield layer and the first extraction electrode portion and a second lead for connection between the upper shield layer and the second extraction electrode portion are each formed so as not to have an overlapping portion with the heatsink layer but to bypass the heatsink layer when observing from the upper shield layer side toward the lower shield layer in a transparent state in plan view. Therefore, it is possible to increase an effect of heat radiation to the substrate side on the basis of the presence of the heatsink layer to thereby limit propagation of heat to a magnetoresistive effect layer as much as possible and further to achieve a drastic improvement in recording and reproducing characteristics at high recording frequencies, i.e. frequency characteristics (f characteristics) in a high frequency region.

What is claimed is:

1. A thin film magnetic head, comprising:
a substate;
a lower shield layer formed on said substrate;
an upper shield layer formed on said lower shield layer;
a read magnetic head element of a Current Perpendicular to Plane (CPP) structure interposed between said lower shield layer and said upper shield layer;
a heatsink layer formed at a rearward portion (in a direction away from an ABS serving as a recording/reproduction-side surface) of said lower shield layer and said upper shield layer;
a first extraction electrode portion and a second extraction electrode portion formed at a further rearward portion (in the direction away from the ABS serving as the recording/reproduction-side surface) of said heatsink layer;
a first lead for connection between said lower shield layer and said first extraction electrode portion, said first lead connects between an exposed connecting portion of said lower shield layer and said first extraction electrode portion to thereby achieve electrical conduction between said lower shield layer and said first extraction electrode portion; and
a second lead for connection between said upper shield layer and said second extraction electrode portion, said second lead configured to connect between a connecting portion on an insulating layer formed on said lower shield layer and said second extraction electrode portion and then said upper shield layer is formed so that a connecting portion of said second lead located at the connecting portion on said insulating layer is connected to said upper shield layer, thereby achieving electrical conduction between said upper shield layer and said second extraction electrode portion,
wherein, when observing from said upper shield layer side toward said lower shield layer in a transparent state in plan view, formation patterns of said first lead and said second lead are each formed so as not to have an overlapping portion with said heatsink layer but to bypass said heatsink layer.

2. The thin film magnetic head according to claim 1, wherein said heatsink layer has a stack structure comprising a lower heatsink portion having the same composition as said lower shield layer and an upper heatsink portion having the same composition as said upper shield layer, and said lower heatsink portion and said upper heatsink portion are formed so as to be separated from said lower shield layer and said upper shield layer.

3. The thin film magnetic head according to claim 1, wherein said read magnetic head element of the CPP structure is a Giant MagnetoResistive (CPP GMR) element or a Tunnel MagnetoResistive (CPP-TMR) element.

4. The thin film magnetic head according to claim 1, wherein said lower shield layer and said upper shield layer have a function of shielding magnetism from the exterior and further have a function as electrodes for causing a current to flow through said read magnetic head element of the CPP structure.

5. A head gimbal assembly comprising:
a slider including a thin film magnetic head and disposed so as to confront a recording medium;
a suspension elastically supporting said slider; and
the thin film magnetic head being a thin film magnetic head as recited in claim 3.

6. A hard disk drive comprising:
a slider including a thin film magnetic head and disposed so as to confront a disc-shaped recording medium driven to be rotated;
a positioning device supporting said slider and positioning said slider relative to said recording medium; and
the thin film magnetic head being a thin film magnetic head as recited in claim 3.

7. A thin film magnetic head, comprising:
a substrate;
a lower shield layer formed on said substrate;
an upper shield layer formed on said lower shield layer;
a read magnetic head element of a Current Perpendicular to Plane structure interposed between said lower shield layer and said upper shield layer;
a heatsink layer formed at a rearward portion (in a direction away from an ABS serving as a recording/reproduction-side surface) of said lower shield layer and said upper shield layer;
a first extraction electrode portion and a second extraction electrode portion formed at a further rearward portion (in the direction away from the ABS serving as the recording/reproduction-side surface) of said heatsink layer;
a first lead for connection between said lower shield layer and said first extraction electrode portion; and
a second lead for connection between said upper shield layer and said second extraction electrode portion,
wherein said first extraction electrode portion has a stack structure comprising a first lower electrode layer portion having the same composition as said lower shield layer and a first upper electrode layer portion having the same composition as said upper shield layer and is formed so as to be separated from said heatsink layer,
wherein said second extraction electrode portion has a stack structure comprising a second lower electrode layer portion having the same composition as said lower shield layer and a second upper electrode layer portion having the same composition as said upper shield layer and is formed so as to be separated from said heatsink layer, and
wherein, when observing from said upper shield layer side toward said lower shield layer in a transparent state in plan view, formation patterns of said first lead and said second lead are each formed so as not to have an overlapping portion with said heatsink layer but to bypass said heatsink layer.

8. The thin film magnetic head according to claim 7, wherein said heatsink layer has a stack structure comprising a lower heatsink portion having the same composition as said lower shield layer and an upper heatsink portion having the same composition as said upper shield layer, and said lower heatsink portion and said upper heatsink portion are formed so as to be separated from said lower shield layer and said upper shield layer.

9. The thin film magnetic head according to claim 7, wherein said read magnetic head element of the CPP structure is a Giant MagnetoResistive (CPP-GMR) element or a Tunnel MagnetoResistive (CPP-TMR) element.

10. The thin film magnetic head according to claim 7, wherein said lower shield layer and said upper shield layer have a function of shielding magnetism from the exterior and further have a function as electrodes for causing a current to flow through said read magnetic head element of the CPP structure.

11. A head gimbal assembly comprising:
a slider including a thin film magnetic head and disposed so as to confront a recording medium;
a suspension elastically supporting said slider; and
a thin film magnetic head being a thin film magnetic head as recited in claim 4.

12. A hard disk drive comprising:
a slider including a thin film magnetic head and disposed so as to confront a disc-shaped recording medium driven to be rotated;
a positioning device supporting said slider and positioning said slider relative to said recording medium; and
a thin film magnetic head being a thin magnetic head as recited in claim 4.

* * * * *